US012726139B2

(12) United States Patent
Hemmer

(10) Patent No.: US 12,726,139 B2
(45) Date of Patent: Sep. 1, 2026

(54) INVERTER SYSTEM AND METHOD FOR OPERATING SAME

(71) Applicant: Schaeffler Technologies AG & Co. KG, Herzogenaurach (DE)

(72) Inventor: Joachim Hemmer, Schesslitz (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 186 days.

(21) Appl. No.: 18/706,449

(22) PCT Filed: Oct. 18, 2022

(86) PCT No.: PCT/DE2022/100768
§ 371 (c)(1),
(2) Date: May 1, 2024

(87) PCT Pub. No.: WO2023/083406
PCT Pub. Date: May 19, 2023

(65) Prior Publication Data

US 2024/0421724 A1 Dec. 19, 2024

(30) Foreign Application Priority Data

Nov. 11, 2021 (DE) ........................ 102021129356.1

(51) Int. Cl.

| | |
|---|---|
| ***H02M 7/5387*** | (2007.01) |
| ***H02M 1/00*** | (2006.01) |
| ***H02P 27/08*** | (2006.01) |

(52) U.S. Cl.
CPC ..... *H02M 7/53876* (2021.05); *H02M 1/0009* (2021.05); *H02P 27/08* (2013.01); *H02M 1/0054* (2021.05)

(58) Field of Classification Search
CPC ........... H02M 7/53876; H02M 1/0009; H02M 1/0054; H02P 27/08; H02P 27/06; H02P 29/50
See application file for complete search history.

(56) References Cited

U.S. PATENT DOCUMENTS 10,381,968 B2 * 8/2019 Agirman ............. H02M 7/5395
11,482,920 B2 * 10/2022 Agirman ................. H02P 27/08
(Continued)

FOREIGN PATENT DOCUMENTS

DE 102018210391 A1 1/2020
DE 102019208559 A1 12/2020
(Continued)

*Primary Examiner* — Kyle J Moody
(74) *Attorney, Agent, or Firm* — Volpe Koenig

(57) ABSTRACT

An inverter system having: a multiphase inverter, which has at least three half bridge circuits, which are parallel-connected to positive and negative connections, all the half bridge circuits each include a high-side switch, arranged between the positive connection and an output of the half bridge circuit, and a low-side switch, arranged between the negative connection and the circuit output, at least two of the half bridge circuits include a resistive shunt arranged between the negative connection and the circuit output, for current measurement; and a control device for actuating the half bridge circuits, is configured to actuate them to generate voltage space vectors in successive switching periods that are generated by a discontinuous pulse width modulation in which at least one of the low-side switches of the at least two half bridge circuits that include a resistive shunt is switched conductively at least once within the switching period.

14 Claims, 3 Drawing Sheets

(56) References Cited

U.S. PATENT DOCUMENTS

2002/0189301 A1 12/2002 Hosoito et al.
2009/0284194 A1* 11/2009 Forte ................. H02M 7/53871
318/400.02
2012/0320650 A1 12/2012 Weinmann et al.
2019/0173410 A1 6/2019 Agirman
2023/0001979 A1* 1/2023 Mori .................. H02M 1/0009

FOREIGN PATENT DOCUMENTS

EP 4092906 A1 11/2022
WO 2021144867 A1 7/2021

* cited by examiner

INVERTER SYSTEM AND METHOD FOR OPERATING SAME

CROSS-REFERENCE TO RELATED APPLICATIONS

This application is the U.S. National Phase of PCT Appln. No. PCT/DE2022/100768, filed Oct. 18, 2022, which claims priority to German Patent Application No. 10 2021 129 356.1, filed Nov. 11, 2021, the entire disclosures of which are incorporated by reference herein.

TECHNICAL FIELD

The disclosure relates to an inverter system having a multiphase inverter and a control device. Furthermore, the disclosure relates to a method for operating an inverter system.

BACKGROUND

Inverter systems can be used in an actuator for a steer-by-wire system or for a roll stabilizer. In such applications, the inverter system is typically arranged at a certain distance from the actuator that is actuated by the inverter system. This generally requires cable connections of a certain length between the inverter system and the actuator. Such cable connections are generally prone to causing undesirable emissions, so electromagnetic compatibility (EMC) limits, especially in the automotive sector, often cannot be met.

SUMMARY

Against this background, the object is to improve the electromagnetic compatibility of an inverter system.

The object is achieved using an inverter system having a multiphase, in particular three-phase, inverter which comprises at least three half-bridge circuits which are connected in parallel to a positive potential connection and to a negative potential connection, wherein all half-bridge circuits each comprise a high-side switch arranged between the positive potential connection and an output of the half-bridge circuit and a low-side switch arranged between the negative potential connection and the output of the half-bridge circuit, characterized in that at least two of the half-bridge circuits include a resistive shunt for current measurement which is arranged between the negative potential connection and the output of the half-bridge circuit, and having a control device for actuating the half-bridge circuits, which is configured to actuate the half-bridge circuits for generating voltage space vectors in successive switching periods in such a way that the voltage space vectors are generated by a discontinuous pulse width modulation, in which at least one of the low-side switches of the at least two half-bridge circuits, which include a resistive shunt, is switched to be conductive at least once within the switching period.

In the inverter system according to the disclosure, in contrast to an inverter system controlled with conventional pulse width modulation, the half-bridge circuits are not actuated in such a way that the switches of the half bridges can be set to all possible states. Rather, the actuation takes place in such a way that one of the half bridges does not carry out a switching operation in each switching period—the low-side switch remains switched to be conductive for the entire switching period. This reduces the number of switching operations, so unwanted electromagnetic emissions due to switching operations are reduced. Electromagnetic compatibility can be improved through these measures. Furthermore, the actuation takes place in such a way that at least one of the low-side switches of those half-bridge circuits that include a resistive shunt is switched to be conductive at least once in each switching period. This can ensure that current flows through one of the resistive shunts at least at one point in time in each switching period so that a current measurement is possible at this point in time, for example to control the inverter or the actuator.

A current measurement with the resistive shunt is preferably always carried out at a point in time at which the low-side switch of the half bridge, of which the resistive shunt is part, is switched to be conductive. Particularly preferably, such a current measurement is carried out at least once in each switching period so that the frequency at which the current measurements are carried out substantially corresponds to the switching frequency specified by the control device (i.e., the inverse of the period length of the switching periods). In this way, a quasi-continuous current measurement can be carried out, for example to control the inverter or the actuator.

According to a preferred embodiment, in the case of discontinuous pulse width modulation, at least one of the low-side switches is switched to be continuously conductive for the entire duration of the switching period. This allows the number of switching operations to be further reduced.

Preferably, all half-bridge circuits of the inverter include a resistive shunt for current measurement which is arranged between the negative potential connection and the output of the half-bridge circuit. With such a configuration, all half-bridge circuits of the inverter can be actuated equally.

According to an advantageous embodiment, the control device for actuating the half-bridge circuits is configured so that the switching periods have a period length in the range of 50 μs to 100 μs. A period length in this range corresponds to a switching frequency in the range of 10 kHz to 20 kHz and enables a further reduction in switching operations to reduce unwanted emissions. In addition, a switching frequency in this range reduces acoustic stress caused by switching frequencies in the frequency range that humans can perceive. The period length is preferably in the range of 50 μs to 75 μs, particularly preferably 50 μs.

According to an advantageous embodiment, the high-side switches and the low-side switches are designed as MOSFETs (metal-oxide semiconductor field-effect transistor) or IGBTs (insulated-gate bipolar transistor).

According to an advantageous embodiment, the high-side switches and the low-side switches have a forward resistance that is in the range of 3 mΩ to 30 mΩ. In the inverter according to the disclosure, the low-side switches, which are arranged in a half bridge with a resistive shunt, can be switched to conduct current for a longer period of time than with conventional actuation with pulse width modulation. By selecting the forward resistance in this way, forward losses can be reduced and unwanted heating of the low-side switches can be reduced. The forward resistance is preferably in the range of 3 mΩ to 20 mΩ, particularly preferably in the range of 3 mΩ to 10 mΩ, for example 3 mΩ.

The disclosure further relates to an actuator for a steer-by-wire system or for a roll stabilizer with an electric machine and an inverter system described above.

The disclosure further relates to a method for operating an inverter system having a multiphase, in particular three-phase, inverter, which comprises at least three half-bridge circuits, which are connected in parallel to a positive potential connection and to a negative potential connection, wherein all half-bridge circuits each comprise a high-side switch arranged between the positive potential connection and an output of the half-bridge circuit and a low-side switch arranged between the negative potential connection and the output of the half-bridge circuit, wherein at least two of the half-bridge circuits comprise a resistive shunt for current measurement which is arranged between the negative potential connection and the output of the half-bridge circuit, wherein the half-bridge circuits are actuated in successive switching periods for generating voltage space vectors in such a manner that the voltage space vectors are generated by discontinuous pulse width modulation, in which at least one of the low-side switches of the at least two half-bridge circuits, which comprise a resistive shunt, is switched to be conductive at least once within the switching period.

The same advantages can be achieved with the actuator and the method for operating an inverter system as have already been described in connection with the inverter system.

According to an advantageous embodiment, currents are measured by means of the resistive shunts and the voltage space vectors are generated on the basis of the measured currents according to the measured currents. In this way, the inverter system or the electric machine actuated by the inverter system can be controlled.

Alternatively or additionally, the advantageous configurations and features described in connection with the inverter system, alone or in combination, can also be used in the actuator and the method for operating an inverter system.

BRIEF DESCRIPTION OF THE DRAWINGS

Further details and advantages of the disclosure will be explained below with reference to the exemplary embodiment shown in the drawings. In the drawings.

DETAILED DESCRIPTION

Figure 1:
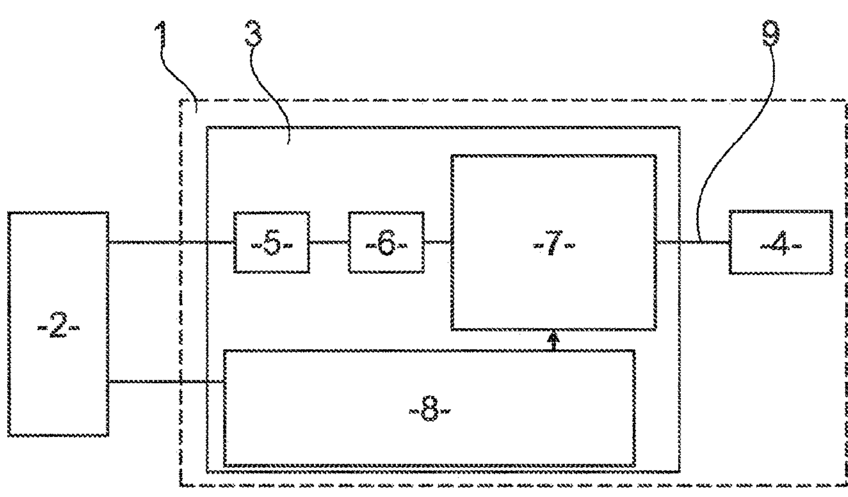
FIG. 1 shows an exemplary embodiment of an actuator according to the disclosure in a block diagram.

FIG. 1 shows a block diagram of an actuator 1, which can be designed as an actuator for a steer-by-wire system or for a roll stabilizer of a motor vehicle. The actuator 1 is connected to a supply network 2, for example an on-board electrical system of a motor vehicle, so that the actuator 1 can be supplied with electrical energy from the supply network 2. If the supply network 2 is designed as an on-board electrical system of a motor vehicle, it can provide a supply voltage of 12 V or 48 V.

The actuator 1 comprises an electric machine 4, for example a permanently excited synchronous machine, and an inverter system 3 for actuating the electric machine 4. The inverter system 3 comprises an inverter 7 with a plurality of half-bridge circuits and a control device 8 for actuating these half-bridge circuits. Further components of the inverter system 3 are an EMC filter 5 and a DC link 6. The inverter 7 is connected on the one hand to this DC link 6 and on the other hand to supply lines 9 for the electric machine 4.

In the actuator 1 according to the exemplary embodiment, the inverter system 3 is not arranged in the immediate vicinity of the electric machine 4, but at a certain distance from the drive 4, so the supply lines 9 between the inverter system 3 and the electric machine 4 have a significant length and can cause electromagnetic emissions. In the inverter system 3 according to the exemplary embodiment, measures are therefore taken to improve the electromagnetic compatibility of the actuator 1. These advantages are to be explained in more detail below with reference to the representations in FIGS. 2 to 5.

Figure 2:
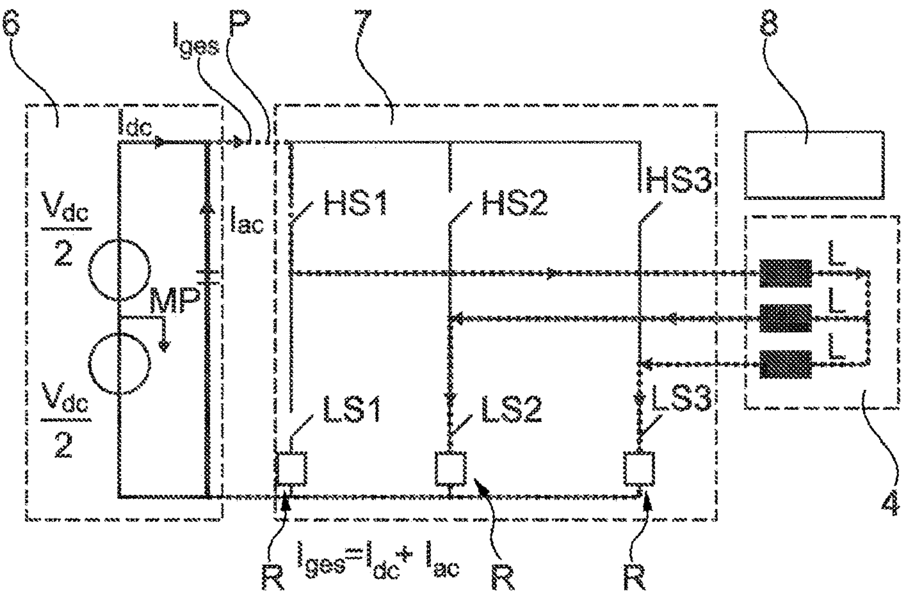
FIG. 2 shows an exemplary embodiment of an inverter system according to the disclosure in a circuit diagram.

FIG. 2 shows the structure of the inverter 7 of the inverter system 3. Also shown are the DC link 6, which is operated at a DC voltage $V_{DC}$, the control device 8 and the electric machine 4, which comprises a three-phase winding L. The inverter 7 is designed as a three-phase inverter with three half-bridge circuits, which are connected in parallel to a positive potential connection P and to a negative potential connection N. The half-bridge circuits each comprise a high-side switch HS1, HS2, HS3 arranged between the positive potential connection and an output of the half-bridge circuit and a low-side switch LS1, LS2, LS3 arranged between the negative potential connection N and the output of the half-bridge circuit. The high-side switches HS1, HS2, HS3 and the low-side switches LS1, LS2, LS3 are designed as MOSFETs in the exemplary embodiment, but can alternatively be designed as IGBTs. The forward resistance of the high-side switches HS1, HS2, HS3 and the low-side switches LS1, LS2, LS3 is in the range of 3 mΩ to 30 mΩ.

Furthermore, in at least two of the half-bridge circuits, here in all half-bridge circuits, a resistive shunt R arranged between the negative potential connection N and the output of the half-bridge circuit is provided for current measurement. The current measurement can be performed via a voltage sensor, not shown. The current measurement data are provided to the control device 8, which, among other things, actuates the high-side switches HS1, HS2, HS3 and the low-side switches LS1, LS2, LS3 of the inverter 7 according to these current measurements, for example to control a torque of the electric machine 4.

The control device 8 is further configured to actuate the half-bridge circuits for generating voltage space vectors in successive switching periods in such a way that the voltage space vectors are generated by discontinuous pulse width modulation, in which at least one of the low-side switches LS1, LS2, LS3 is switched to be conductive at least once within the switching period. In the present case, at least one of the low-side switches LS1, LS2, LS3 is switched to be continuously conductive for the entire duration of the switching period. The corresponding resistive shunt is then current-carrying and can therefore be used to measure current. In addition, this switching strategy reduces the frequency of switching operations and thus contributes to fewer switching-related electromagnetic emissions.

Figure 3:
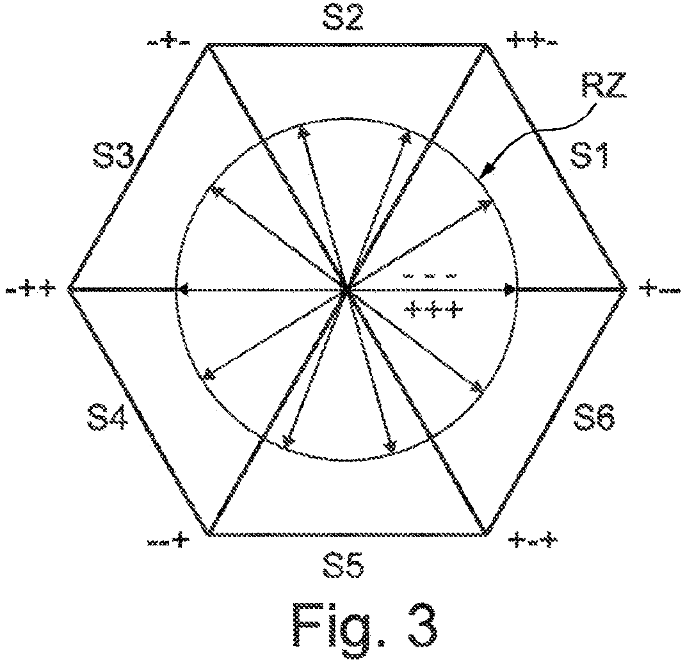
FIG. 3 shows an exemplary representation of space vectors.

The FIG. 3 shows an exemplary representation of space vectors RZ in six different sectors S1-S6. The boundaries of the sectors are marked by a three-digit indication of the switching position of the half-bridges, with a half bridge which has a high-side switch H1, H2, H3 that is conductive being referred to with "+" and a half bridge which has a low-side switch L1, L2, L3 that is conductive being referred to with "–".

Figure 4:
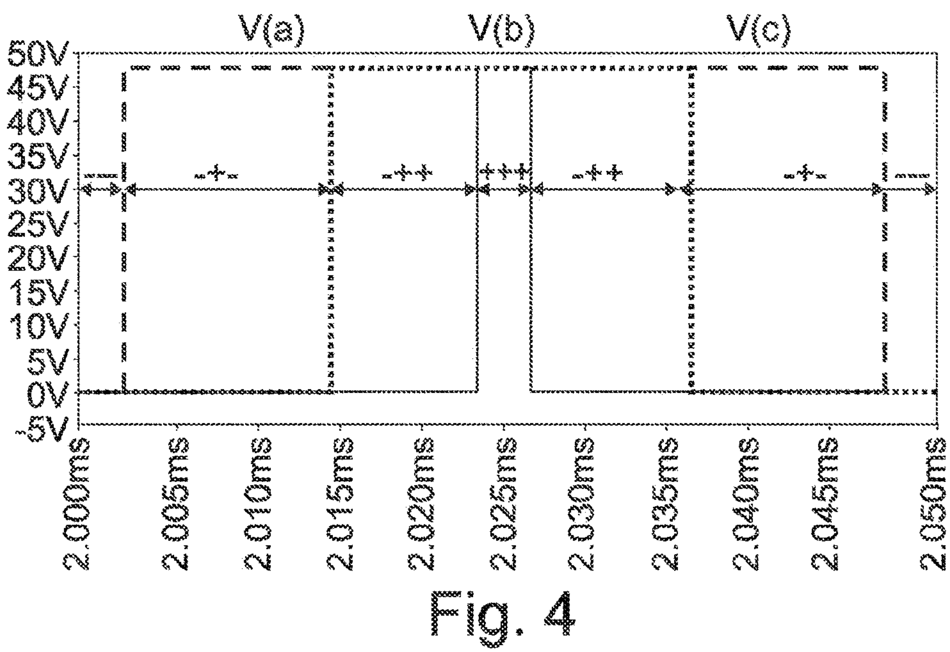
FIG. 4 shows a pulse waveform for generating a space vector in sector 1 according to conventional pulse width modulation.

FIG. 4 shows a pulse sequence of a switching period, which is suitable for generating a space vector in sector S1 according to a conventional pulse width modulation method. The time in ms is plotted on the abscissa and the output potential in V is plotted on the ordinate. The potentials V(a), V(b), V(c) provided at the output of the half bridge and the corresponding switching positions of the half bridges are indicated using the "+/−" notation explained above. It can be seen that, according to this conventional switching strategy, the half bridges of the inverter switch in such a way that none of the three low-side switches are conductive at any given point in time ("+++").

Figure 5:
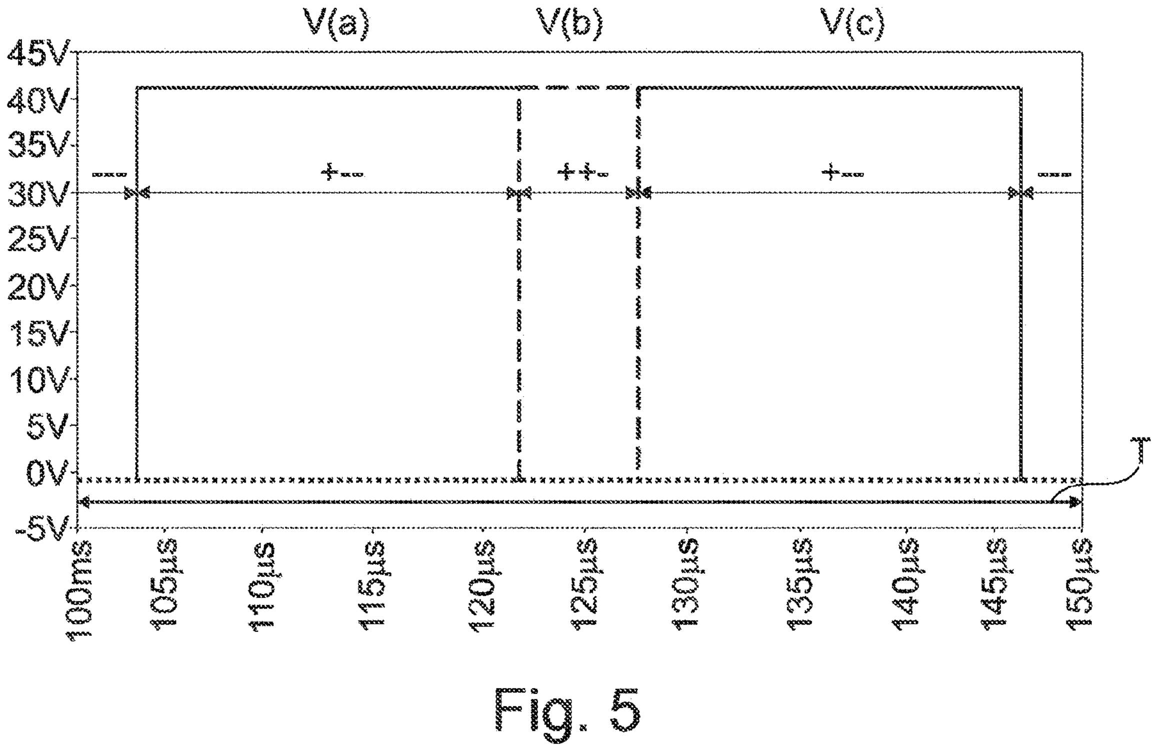
FIG. 5 shows a pulse waveform for generating a space vector in sector 1 according to the disclosure.

The FIG. 5 shows, however, a pulse sequence according to the switching strategy used in the inverter system 3 according to the disclosure. The time in s is plotted on the abscissa and the output potential in V is plotted on the ordinate. Here, a low-side switch L1, L2, L3 of one of the half bridges is switched to be continuously conductive so that the half bridge containing this low-side switch L1, L2, L3 continuously supplies the output potential 0 V.

It can also be seen in FIG. 5 that the switching periods have a period length T in the range of 50 μs to 100 μs, here 50 μs.

The inverter system explained above has improved EMC behavior.

LIST OF REFERENCE SIGNS

1 Actuator
2 Supply network
3 Inverter system
4 Electric machine
EMC filter
6 DC link
7 Inverter
8 Control device
9 Supply lines
HS1, HS2, HS3 High-side switch
LS1, LS2, LS3 Low-side switch
L Winding
N Negative potential connection
P Positive potential connection
R Resistive shunt
S1-S6 Sector
V(a), V(b), V(c) Output potential of a half bridge
$V_{DC}$ Supply voltage

The invention claimed is:

1. An inverter system, comprising:

a multiphase inverter which comprises at least three half-bridge circuits which are connected in parallel to a positive potential connection and to a negative potential connection;

wherein all half-bridge circuits each comprise a high-side switch arranged between the positive potential connection and an output of the half-bridge circuit and a low-side switch arranged between the negative potential connection and the output of the half-bridge circuit;

at least two of the half-bridge circuits comprise a resistive shunt for current measurement which is arranged between the negative potential connection and the output of the half-bridge circuit; and a control device for actuating the half-bridge circuits, which is configured to actuate the half-bridge circuits for generating voltage space vectors in successive switching periods such that the voltage space vectors are generated by a discontinuous pulse width modulation, in which at least one of the low-side switches of at least of the two half-bridge circuits, which comprise the resistive shunt, is switched to be conductive at least once within a switching period.

2. The inverter system according to claim 1, wherein all of the half-bridge circuits of the inverter comprise one of the resistive shunts for current measurement which is arranged between the negative potential connection and the output of the half-bridge circuit.

3. The inverter system according to claim 1, wherein the control device for actuating the half-bridge circuits is configured so that the switching periods have a period length in a range of 50 μs to 100 μs.

4. The inverter system according to claim 1, wherein the high-side switches and the low-side switches are designed as MOSFETs or IGBTs.

5. The inverter system according to claim 1, wherein the high-side switches and the low-side switches have a forward resistance which is in a range of 3 mΩ to 30 mΩ.

6. An actuator for a steer-by-wire system or for a roll stabilizer having an electric machine and the inverter system according to claim 1.

7. A method for operating an inverter system having a multiphase inverter, which comprises at least three half-bridge circuits, which are connected in parallel to a positive potential connection and to a negative potential connection, wherein all of the half-bridge circuits each comprise a high-side switch arranged between the positive potential connection and an output of the half-bridge circuit and a low-side switch arranged between the negative potential connection and the output of the half-bridge circuit, wherein at least two of the half-bridge circuits comprise a resistive shunt for current measurement which is arranged between the negative potential connection and the output of the half-bridge circuit, the method comprising:

actuating the half-bridge circuits in successive switching periods for generating voltage space vectors such that the voltage space vectors are generated by discontinuous pulse width modulation; and switching at least one of the low-side switches of the at least two half-bridge circuits which comprise the resistive shunt to be conductive at least once within a switching period.

8. The method according to claim 7, further comprising measuring currents using the resistive shunts and generating the voltage space vectors based on the measured currents.

9. An inverter system, comprising:

a three-phase inverter which comprises three half-bridge circuits which are connected in parallel to a positive potential connection and to a negative potential connection;

the three half-bridge circuits each comprise a high-side switch arranged between the positive potential connection and an output of the half-bridge circuit and a low-side switch arranged between the negative potential connection and the output of the half-bridge circuit;

at least two of the half-bridge circuits comprise a resistive shunt for current measurement which is arranged between the negative potential connection and the output of the half-bridge circuit; and a controller for actuating the three half-bridge circuits, and is configured to actuate the three half-bridge circuits for generating voltage space vectors in successive switching periods such that the voltage space vectors are generated by a discontinuous pulse width modulation, in which at least one of the low-side switches of at least two of the half-bridge circuits, which comprise the resistive shunt, is switched to be conductive at least once within a switching period.

10. The inverter system according to claim 9, wherein all of the half-bridge circuits of the inverter comprise one of the resistive shunts for current measurement which is arranged between the negative potential connection and the output of the half-bridge circuit.

11. The inverter system according to claim 9, wherein the controller for actuating the half-bridge circuits is configured so that the switching periods have a period length in a range of 50 μs to 100 μs.

12. The inverter system according to claim 1, wherein the high-side switches and the low-side switches are designed as MOSFETs or IGBTs.

13. The inverter system according to claim 9, wherein the high-side switches and the low-side switches have a forward resistance which is in a range of 3 mΩ to 30 mΩ.

14. An actuator for a steer-by-wire system or for a roll stabilizer having an electric machine and the inverter system according to claim 9.

* * * * *